United States Patent
Achour et al.

(10) Patent No.: US 11,513,214 B2
(45) Date of Patent: Nov. 29, 2022

(54) RADAR SYSTEM FOR INTERNAL AND EXTERNAL ENVIRONMENTAL DETECTION

(71) Applicant: Metawave Corporation, Carlsbad, CA (US)

(72) Inventors: Maha Achour, Encinitas, CA (US); Chiarra Pelletti, San Francisco, CA (US); Sandra Lynn Godsey, Carlsbad, CA (US)

(73) Assignee: Metawave Corporation, Carlsbad, CA (US)

( * ) Notice: Subject to any disclaimer, the term of this patent is extended or adjusted under 35 U.S.C. 154(b) by 276 days.

(21) Appl. No.: 16/690,042

(22) Filed: Nov. 20, 2019

(65) Prior Publication Data

US 2020/0158864 A1 May 21, 2020

Related U.S. Application Data

(60) Provisional application No. 62/770,076, filed on Nov. 20, 2018.

(51) Int. Cl.
| | |
|---|---|
| *G01S 13/931* | (2020.01) |
| *H01Q 1/32* | (2006.01) |
| *B60Q 9/00* | (2006.01) |
| *G01S 13/88* | (2006.01) |
| *H04W 4/46* | (2018.01) |

(52) U.S. Cl.
CPC ............ *G01S 13/931* (2013.01); *B60Q 9/00* (2013.01); *G01S 13/886* (2013.01); *H01Q 1/3233* (2013.01); *H04W 4/46* (2018.02)

(58) Field of Classification Search
CPC ......... B60Q 9/00; G01S 13/42; G01S 13/582; G01S 13/584; G01S 13/886; G01S 13/931; G01S 13/9316; G01S 2013/93185; G01S 2013/932; G01S 2013/9322; G01S 2013/93271; H01Q 1/3233; H04L 67/22; H04W 4/40; H04W 4/46

See application file for complete search history.

(56) References Cited

U.S. PATENT DOCUMENTS

| | | | | |
|---|---|---|---|---|
| 10,479,371 | B1 * | 11/2019 | Kim | B60W 40/08 |
| 2018/0213414 | A1 * | 7/2018 | Be | H04B 1/3822 |
| 2019/0293777 | A1 * | 9/2019 | Takemoto | G01S 7/41 |
| 2019/0355178 | A1 * | 11/2019 | Hermina Martinez | G06T 19/006 |
| 2020/0098265 | A1 * | 3/2020 | Agnew | B60K 28/066 |

(Continued)

*Primary Examiner* — Timothy X Pham
(74) *Attorney, Agent, or Firm* — Sandra Lynn Godsey

(57) ABSTRACT

Examples disclosed herein relate to radar systems to coordinate detection of objects external to the vehicle and distractions within the vehicle. A method of environmental detection with a radar system includes detecting an object in an external environment of a vehicle with the radar system positioned on the vehicle. The method includes determining a distraction metric from measurements of user activity obtained within the vehicle with the radar system. The method includes adjusting one or more detection parameters of the radar system based at least on the detected object and the distraction metric. Other examples disclosed herein relate to a radar sensing unit for a vehicle that includes an internal distraction sensor, an external object detection sensor, a coordination sensor and a central controller for internal and external environmental detection.

18 Claims, 12 Drawing Sheets

(56) References Cited

U.S. PATENT DOCUMENTS

2020/0132475 A1* 4/2020 Knorr .................... G01C 21/32
2021/0370983 A1* 12/2021 Oba ...................... B60W 50/14

* cited by examiner

RADAR SYSTEM FOR INTERNAL AND EXTERNAL ENVIRONMENTAL DETECTION

CROSS-REFERENCE TO RELATED APPLICATIONS

This application claims priority from U.S. Provisional Application No. 62/770,076, titled "METHOD AND APPARATUS FOR INTERNAL AND EXTERNAL ENVIRONMENTAL DETECTION IN A RADAR SYSTEM," filed on Nov. 20, 2018, of which is incorporated by reference herein.

BACKGROUND

Autonomous vehicles and Automated Driver Assist Systems (ADAS) are the next phase of transportation around the world. While the main objective of such systems is to improve safety both for the individual and for the roadways and cities, these systems rely on accurate, reliable systems in a variety of situations, as well as the control decisions thereof. Replacing a human driver requires the ability to detect objects in the environment, predict behavior of other vehicles, and decision-making to replace the heuristic knowledge.

BRIEF DESCRIPTION OF THE DRAWINGS

The present application may be more fully appreciated in connection with the following detailed description taken in conjunction with the accompanying drawings, which are not drawn to scale and in which like reference characters refer to like parts throughout, and wherein:

FIG. 4 illustrates a state diagram for operation of a metasensor radar system having internal vehicle activity and external environmental information, according to example implementations of the subject technology;

DETAILED DESCRIPTION

Figure 1:
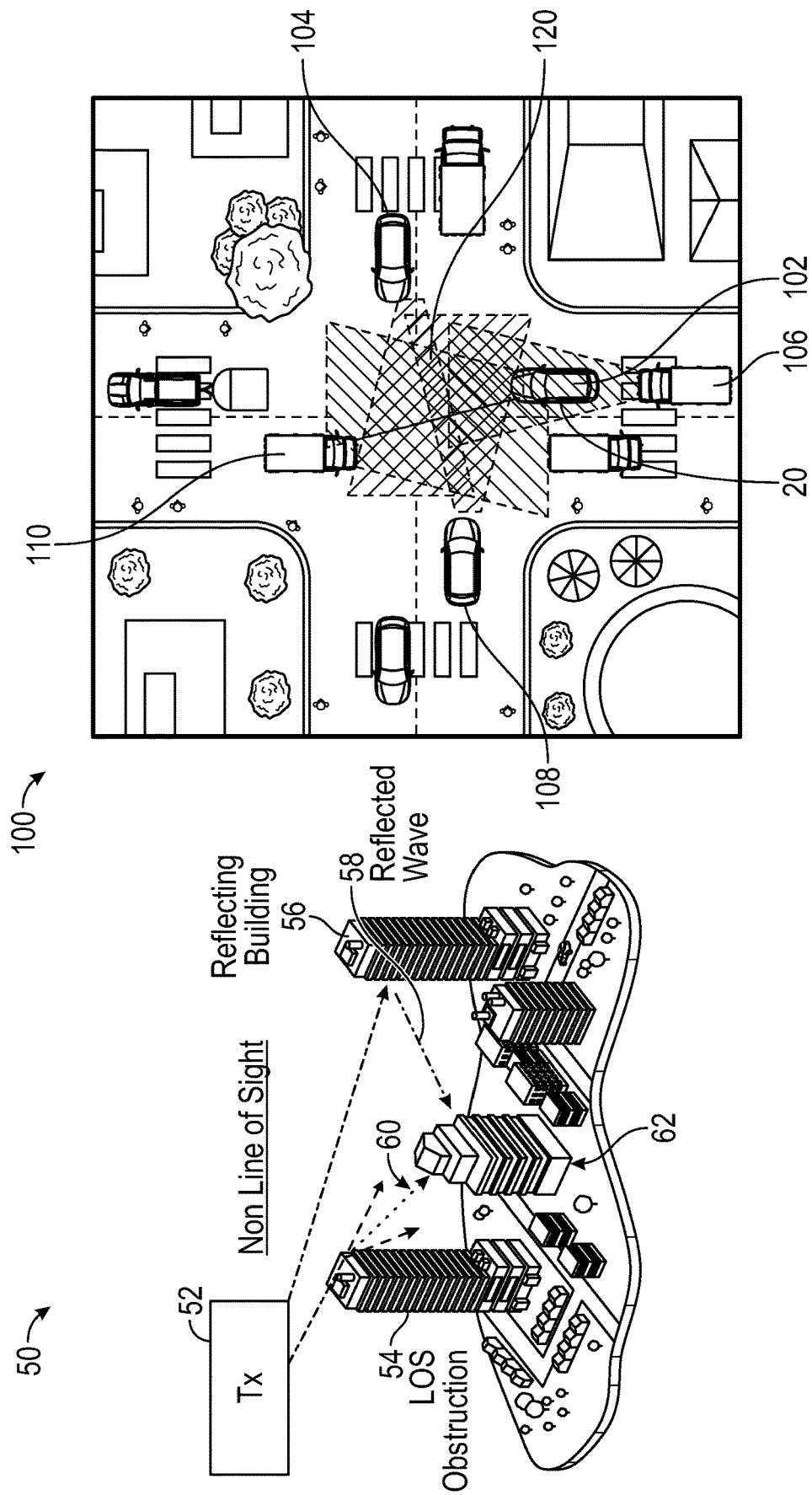
FIG. 1 illustrates a driving scenario, according to implementations of the subject technology.

The present disclosure relates to driver assist systems, and specifically to radar systems for detecting comprehensive environmental conditions. The present disclosure provides for methods and apparatuses to enable reliable, accurate and flexible object detection in a radar system, in which such systems enable detection of conditions external to the vehicle as well as internal to the vehicle. In communications and object detection applications, a signal is transmitted to communicate information or identify a location of an object.

For object detection, such as for operation of a vehicle, a transmission path from a transmitter to a receiver in a communication system or from an object detection sensor to an object has a field of view within which the transmissions are uninterrupted. This field of view is referred to as a line-of-sight (LOS). Within the LOS, transmission signals travel directly to a receiver or an object. For electromagnetic millimeter wavelength transmissions, an antenna transmits signals as a beamform that defines the LOS. In real world systems there are often obstacles that obstruct the direct transmission, such as buildings, trees, and so forth; these obstructions may act as reflection or deflection points that change the direction of all or some of the transmission signal. A reflection or deflection may also be referred to as an echo. Note that throughout this description the term reflection is used to refer to the change in direction of energy transmitted from an antenna or transmission source, and includes both reflections and deflections. The energy is reflected or redirected on interaction with an obstacle. The processes and examples are described herein with respect to an object detection sensor employing a radar sensor; however, these processes, methods and apparatuses are applicable to other systems using transmissions for communication or object detection.

For internal activity, health monitors may consider the attention of a driver, their heart rate and so forth. In the present implementations, the internal monitoring is to detect not only health issues, but also a distraction metric, such as noise, electronic activity, motion in the vehicle and so forth. The ability to provide information related to the external environment and the internal conditions of the vehicle is referred to herein as a "metasensor." The different information may be used to adjust the sensitivity and operation of one or more of these sensors. Where the metasensor includes a radar system for object detection in the path of the vehicle and around the vehicle, the radar system may include an internal distraction detection sensor as disclosed herein.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

FIG. 1 illustrates a communication system 50 having both LOS and NLOS transmission paths. A transmitter 52, which may be a transceiver, transmits signals in a first direction, wherein the signals interact with reflecting building 56 and the reflected waves 58 change direction and are received at building 62. Signals in a second direction have an obstruction within the LOS 54 which reflects waves 60 in multiple directions. In this system there may be receivers located in NLOS areas as the LOS transmissions are obstructed by buildings.

Also depicted in FIG. 1 is an environment in which multiple vehicles are operating with object detection systems, such as for autonomous driving or for an automated driver assistance system (ADAS). The environment 100 is a transportation intersection with activity in all directions. Any sensor in the vehicles that is detecting objects is moving with the vehicle in a dynamic environment. Object detection in NLOS areas is thus a critical capability. Here NLOS refers to radio transmissions, such as radar transmissions, across a partially or fully obstructed path: these obstructions are typically physical objects, such as a building. There are many applications for the present disclosure disclosed herein and some implementations of the disclosure are illustrated in a radar system for driver assist and autonomous operation of a vehicle. This is not meant to be limiting, but rather provided for clarity of understanding.

An object detection system in a vehicle includes a sensor that moves with the vehicle, and therefore the sensor position and sensor field of view is in motion. Such sensors are tasked with understanding the environment within which they operate. There are a variety of sensors, and often a design incorporates multiple sensors, including camera, radar, lidar, ultrasound and others.

In object detection systems incorporating a radar modulation scheme, such as FMCW, the difference between transmit and receive signals provides range information and velocity. The velocity is deduced from the phase difference between the transmit and receive signals. The distance to an object, or the range, and the velocity are collated as range-Doppler (RD) information, or mapping, to interpret the environment. The use of FMCW has many advantages in RD detection.

Similarly, there are many other modulation schemes that may provide information as to the location of an object, and these schemes may be combined and used together. Another method is pulse code modulation (PCM). When an antenna provides multiple transmission signals and is able to receive multiple transmission signals, the difference between these signals provides information as to range, velocity, reflectivity, direct reflection/deflection and so forth. The present disclosure is not limited to a specific modulation scheme.

The present disclosure may be applied in a transportation system, such as environment 100 of FIG. 1. There are multiple vehicles traveling within this transportation environment 100, wherein at least some of the vehicles have object detection radar systems. The system 100 is illustrated with vehicle 102 having an object detection radar system for both long-range and short-range detection. Other systems may incorporate any number of range detection level(s). The other vehicles have radar systems that are also illustrated, such as vehicles 104, 106, 108, 110. The radar beams from several vehicles are provided in shadow, such as beam 120 of vehicle 102. The vehicle Radar Sensing Unit (RSU) 20 is positioned on or within vehicle 102. Vehicles operating in the environments illustrated in FIG. 1 consider the velocity of the vehicle under consideration as well as the velocity of different objects in the environment. These systems may be able to distinguish a wall from a pedestrian from a vehicle. The action taken is typically based on the assumption that the vehicle operates according to prescribed rules, such as to stay in your lane and to slow down at an intersection. There may, however, be any number of conditions that impair the ability of the driver to react and respond to changes in the environment. These conditions are not limited to the health and ability of the driver, but also impact a distraction metric within the vehicle. The distraction metric includes measuring volume of radio and media playing in the vehicle that may impair the driver's ability to hear siren, horn or crash sounds that would otherwise alert the driver to a condition requiring attention and possible action. Another condition impacting the distraction metric is the activity in the vehicle, such as children moving around, adults having an argument, and so forth. Still other conditions include electronic activity, where the driver may be texting or using applications on a mobile device or on a screen within the vehicle, as these take the attention of the driver away from fully focusing on controlling the vehicle. Still other conditions include the health of the driver, such as when heart rate increases, hands shake, eyes close for too long, hands are not touching the steering wheel, eyes are reading a book or information, the foot pressure on the brake is weak, and so forth. The distractions are critical to proper operation of a vehicle and are also important when a driver is supervising operation of a self-driving vehicle, such as a level 4 autonomous vehicle.

Figure 2:
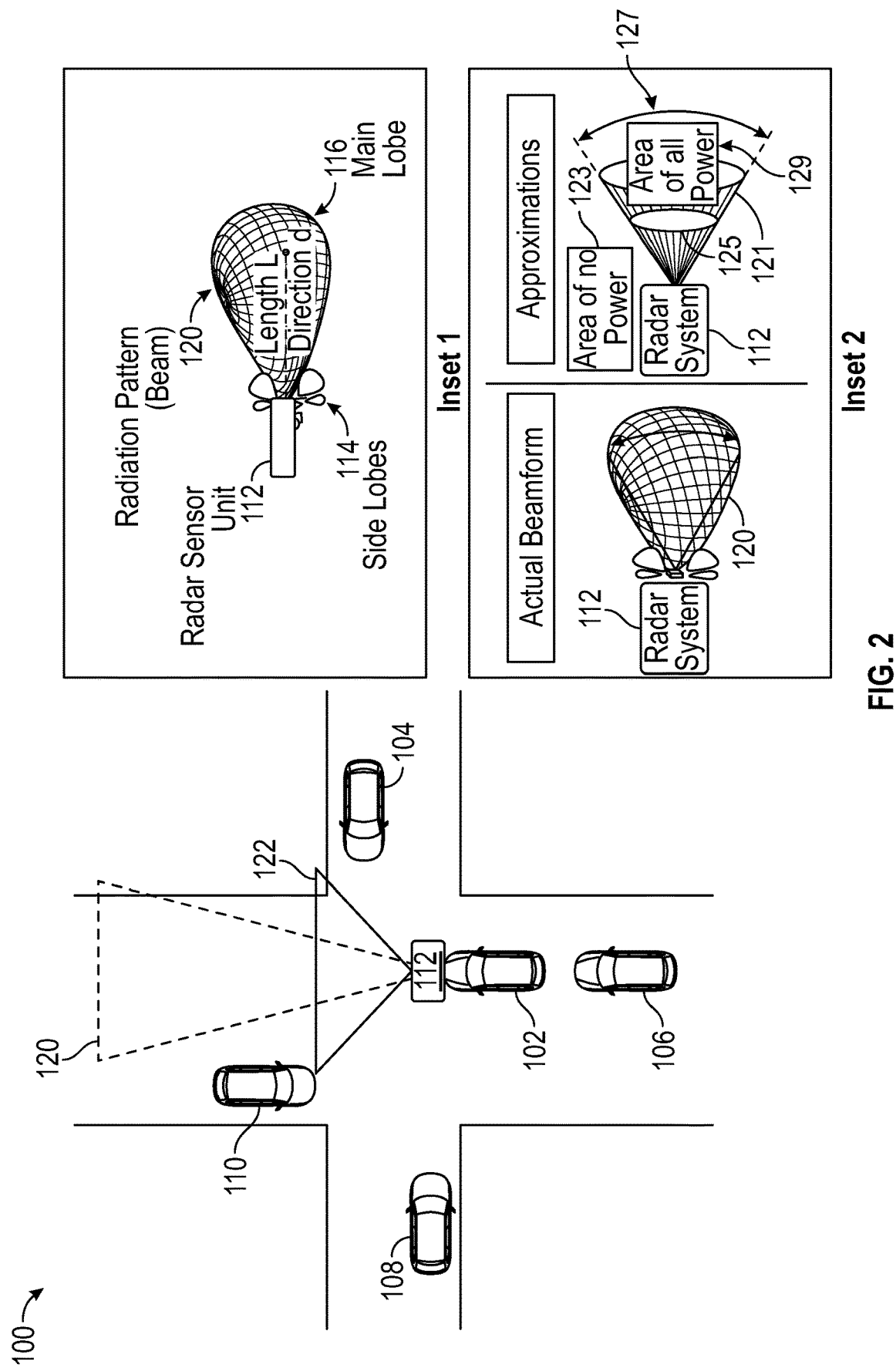
FIG. 2 illustrates operation of multiple radar detection systems, according to implementations of the subject technology.

FIG. 2 illustrates the environment 100 isolating vehicle 102 to illustrate the short-range radar beam 122 and the long-range radar beam 120. The position of vehicle 102 with respect to the other moving vehicles and with respect to the infrastructure is described. Objects, including other vehicles within the short and long-range beam areas are detectable within the area of beams 120, 122. This includes reflections and multi-path transmissions that pass through these areas. For simplicity, the areas are drawn as 2-D images, however, these beams are 3-D spatial images and they move as the RSU moves with a vehicle, and therefore, in that sense these beams are 4-D, including 3 dimensions and time. An inset image is also illustrated of radiation pattern, or beam, 120 having a directivity in a direction d, and a length L indicating the length to a 3 dB intensity point. The ratio of the radiation intensity in any direction d to the intensity averaged over all directions is the directive gain of the antenna in that direction. The directive gain along the direction in which that quantity is maximized is known as the directivity of the antenna, and the directivity multiplied by the radiation efficiency is the power gain of the antenna (very often just referred to as the gain, G). In the direction of maximum radiated power density there is G times more power than we would have obtained from an isotropic antenna. Consider that antennas radiate the power that is supplied. The higher the gain G of a directional antenna, the more narrowly focused is the energy radiated from it.

In the implementations and examples provided herein, there is an assumption made that there exists a mathematical relationship between the gain of an antenna and the specific dimensions of the focused beam. This assumption results in an approximation that all radiated energy of an antenna is uniformly distributed across a beam with some solid angle $\Omega_{beam}$ and that no energy is radiated elsewhere. In this case, the directivity of the antenna must be equal to the ratio of the beam's solid angle, $\Omega_{beam}$, to the total area of the unit sphere ($4\pi$) and the solid angle, $\Omega_{beam}$, is inversely proportional to the directivity as illustrated in FIG. 2, insets. If the antenna has high directivity and radiates most of the received energy, then the gain and directivity are approximately the same and the size of the beam is inversely proportional to the gain. The beam angle is roughly the square root of the beam solid angle when the beam is reasonably symmetric. In most aspects the terms beam and beamform may be used interchangeably.

Continuing with FIG. 2, INSET 1 illustrates RSU 112, also referred to as a vehicle radar unit (VRU), and a corresponding actual beamform, radiation pattern 120. The main lobe 116 is directed in direction d. There are also side lobes 114, which are designed to be minimized so as not to act as interference and object detection misdirects.

INSET 2 illustrates an approximation of the actual beamform that enables calculations, simulations, analysis and design of an antenna in a radar system, such as RSU 112. The approximation replaces the radiation pattern 120, including both main lobe 116 and side lobes 114, as radiation pattern 121. In this approximation there is no power in area 123, and all of the power is present in the area 129 within the cone-shaped radiation pattern 121. The approximation is that all energy radiated by the antenna is uniformly distributed across beamform 121 in a cone form within the area of a solid angle $\Omega_{beam}$ 125 that is a measure of the field of view from the RSU 112. The beam 121 is approximated to be symmetric and therefore beam angle $\theta_{beam}$ 127 is then approximately equal to the square root of the beam solid angle 125. For clarity, these 3D features are described by slices of the radiation pattern beamform in planes that pass through symmetry axes of the beamform.

The RSU 112 of vehicle 102 may transmit radiation beamforms in a variety of directions. In some implementations, the RSU 112 steers the beam, changing the directivity of the beamform. When a beam is directed toward an object or obstruction there is a reflection or redirection of the energy of the beamform, sending energy in directions and areas that may be in NLOS areas.

As described herein, a driving environment, such as the situation 100, may include any number of vehicles, obstacles, pedestrians, buildings, animals and so forth. Control of a vehicle must therefore consider these conditions and must also consider activity and distractions within a vehicle. A vehicle has several sensors within the vehicle used for other purposes, such as a microphone for voice commands, a stereo controller to monitor radio amplitudes, a communication system to identify text message activity and voice calls on a cellular phone, and so forth. Many cars are equipped with pressure sensors on the seats that provide indicators for seatbelt notification and so forth. Other sensors may determine external temperature, internal temperature, incident light on a windshield, load of the car, and so forth. While these sensors are typically designed with a specific purpose in mind, these may provide additional information for driver assistance and autonomous control. In some examples, an electrochromic device or surface is provided in one or more windows, such as the windshield, wherein the glass darkens or lightens according to the incident light and temperature. This sensor may be used to identify conditions of poor visibility for a driver and initiate a warning to the driver, control of the glass, or more sensitive operation of a radar sensor and so forth.

Figure 3:
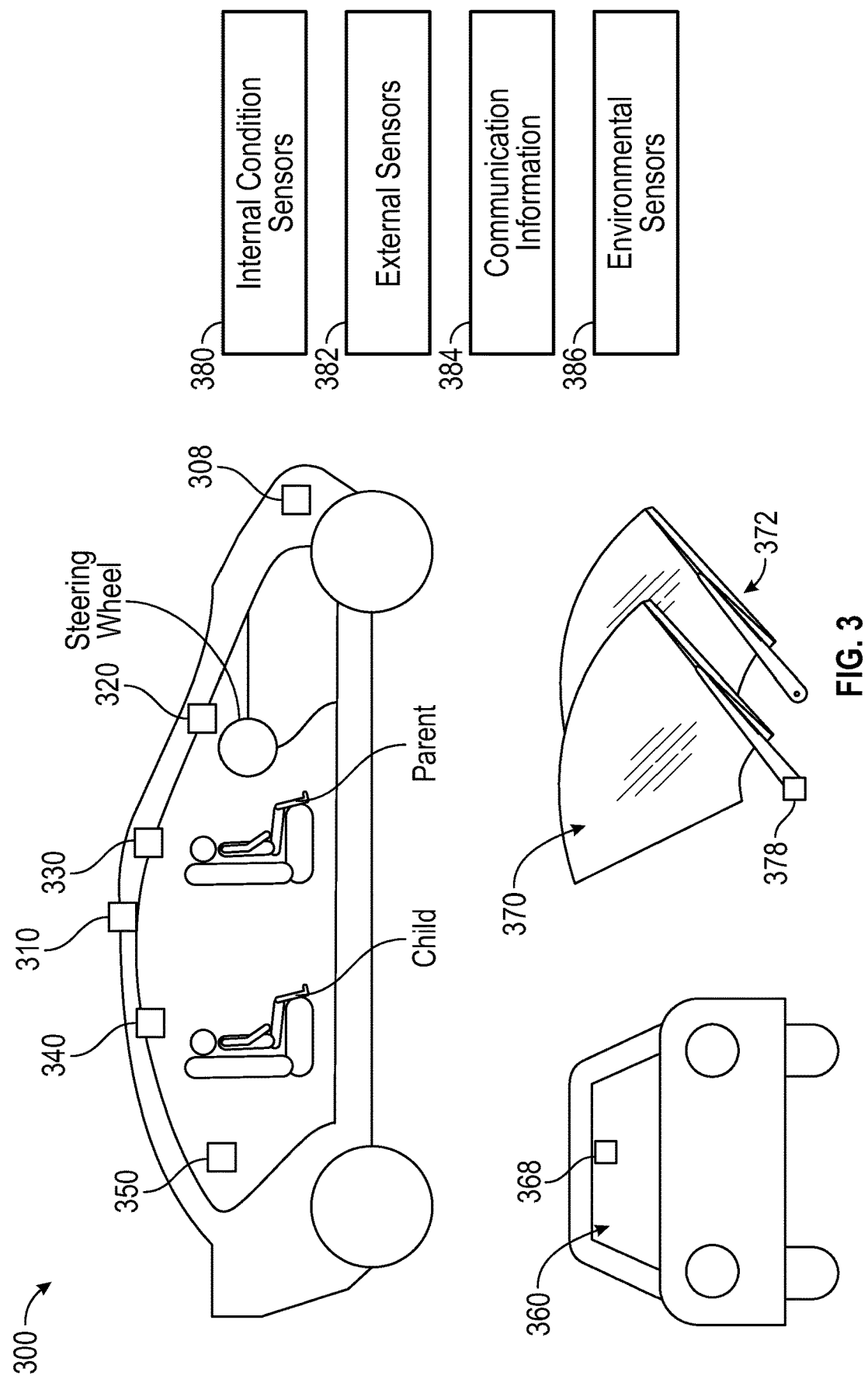
FIGS. 3 and 4 illustrate a vehicle having multiple sensors, including internal and external sensors, according to implementations of the subject technology.

FIG. 3 illustrates a vehicle 300 having multiple monitors making up a metasensor system, where a radar unit 308 detects objects and conditions external to the vehicle 300 and the other sensor, 310, 320, 330, 340, and 350 detect conditions within the vehicle 300. A metasensor system is a system that incorporates multiple sensors and may expand the use of a specific sensor or group of sensors to enable identification of other conditions. For example, the seat pressure sensors may be used to indicate not only real time vehicle carrying load, but also may be used to identify movement of passengers, such as small children or animals, that may cause a distraction to the driver.

The radar unit 308 is a metasensor having capability to detect objects and conditions external to the vehicle 300 as well as conditions and activities within the vehicle 300 that impact the distraction metric. The radar unit 308 includes an antenna portion that directs radiation beams in a forward direction from the vehicle 300 and includes a second antenna portion that directs radiation beams inward to the vehicle. These may be configured and manufactured together into a single module or may be distributed to achieve coverage. The radar unit 308 may also include a controller to receive information from within the vehicle's sensors. In some implementations door sensors detect the condition of the door to identify an unsafe operating condition. Other sensors identify air flow, oxygen level and so forth, all of which may indicate an unsafe condition for driving.

Figure 11:
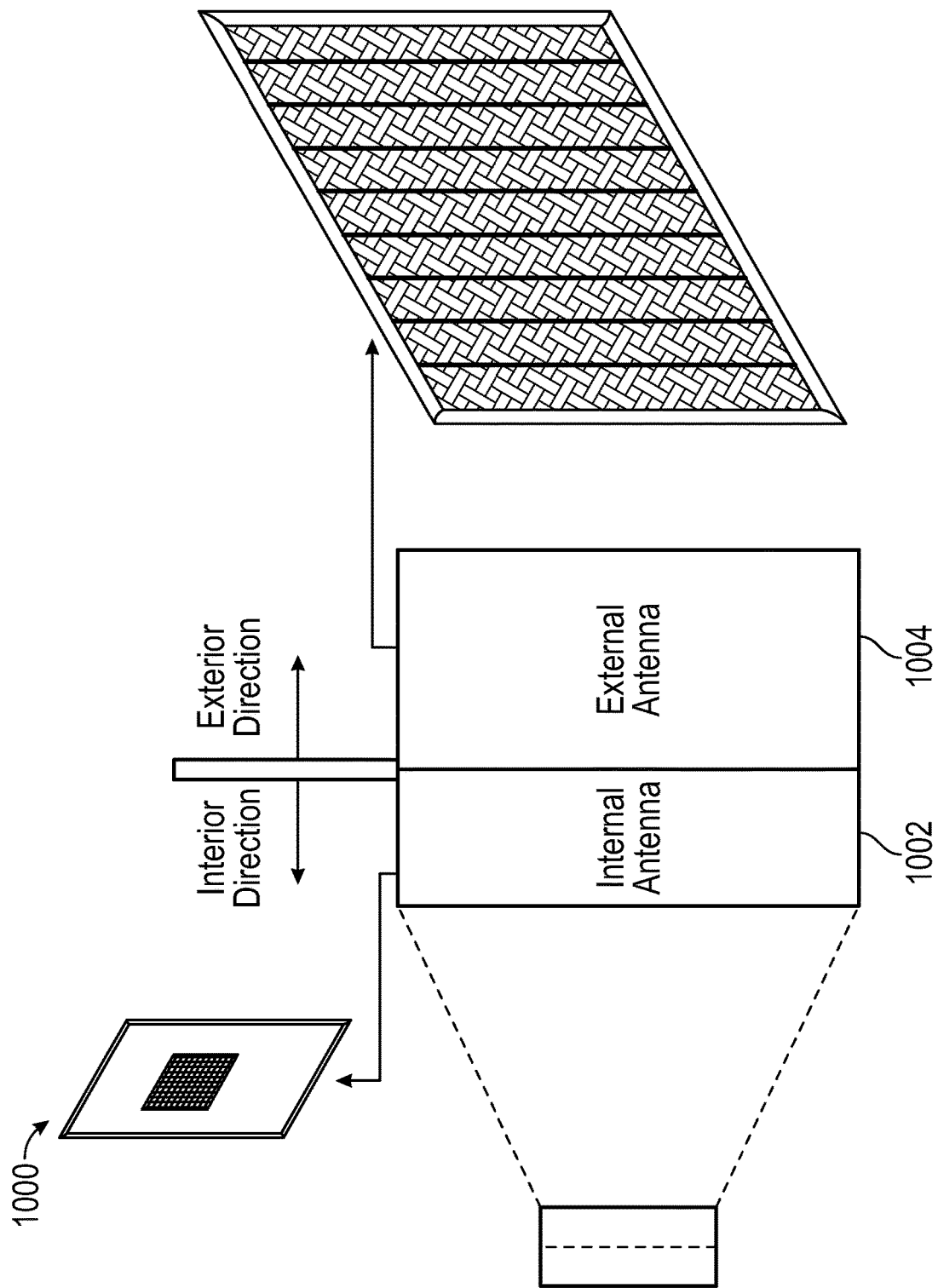
FIG. 11 illustrates a metasensor antenna unit, according to implementations of the subject technology.

In another implementation, a vehicle 360 has a metasensor 368 located on or near the windshield 360, such as on a rear-view mirror, with the external and internal portions as detailed in FIG. 11. The position of the radar unit 368 enables detection of conditions within the vehicle to identify distractions and conditions that may impact driving.

In another implementation, the metasensor unit 378 is configured in the windshield wiper mechanism 372 of the windshield 370. There are a variety of positions for metasensor units in the vehicle, and there may be multiple distributed monitors that may act independently or coordinate with other monitors within a vehicle, such as the various sensors illustrated in vehicle 300. For a coordinated system, a metasensor 308 may include modules such as internal sensor 380, external sensors 382, communication information module 384 and environmental sensors 386.

Figure 4:
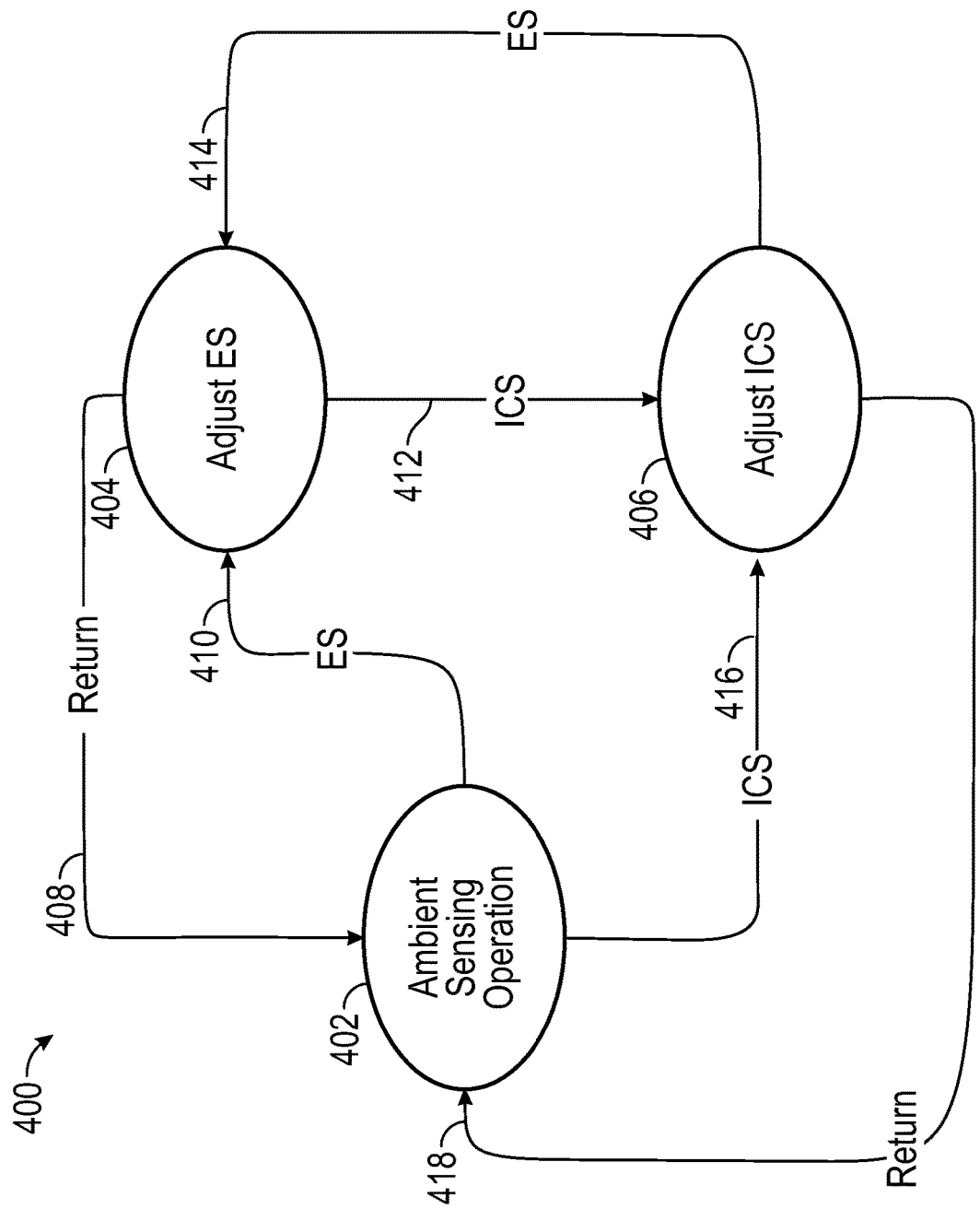

Operation of a metasensor, such as metasensor 308, is illustrated in the state diagram of FIG. 4. Ambient sensing operation state 402 indicates the default condition of the system without any adjusted focus. The ambient state has a set of scanning times, amplification values and so forth. When a condition indicates a focus is required on a specific sensor, then that adjustment is made to accomplish the comprehensive monitoring. For example, if the driver is distracted having a distraction measure above a threshold triggering adjustment of an external sensor 410 and operation transitions to state 404. Similarly, if the external environment indicates a difficult or dangerous condition, such as icy roads or foggy conditions, the system may require more sensing internally to ensure the driver is paying sufficient attention 416 and transitions to state 406 to adjust operation of the internal condition sensor (ICS). The transitions may occur from an adjustment state, such as states 404, 406 to each other, 412, 414 or back to the ambient state 402. Once an adjustment is made there is a state transition back to ambient state, such as return paths 418, 408.

Figure 5:
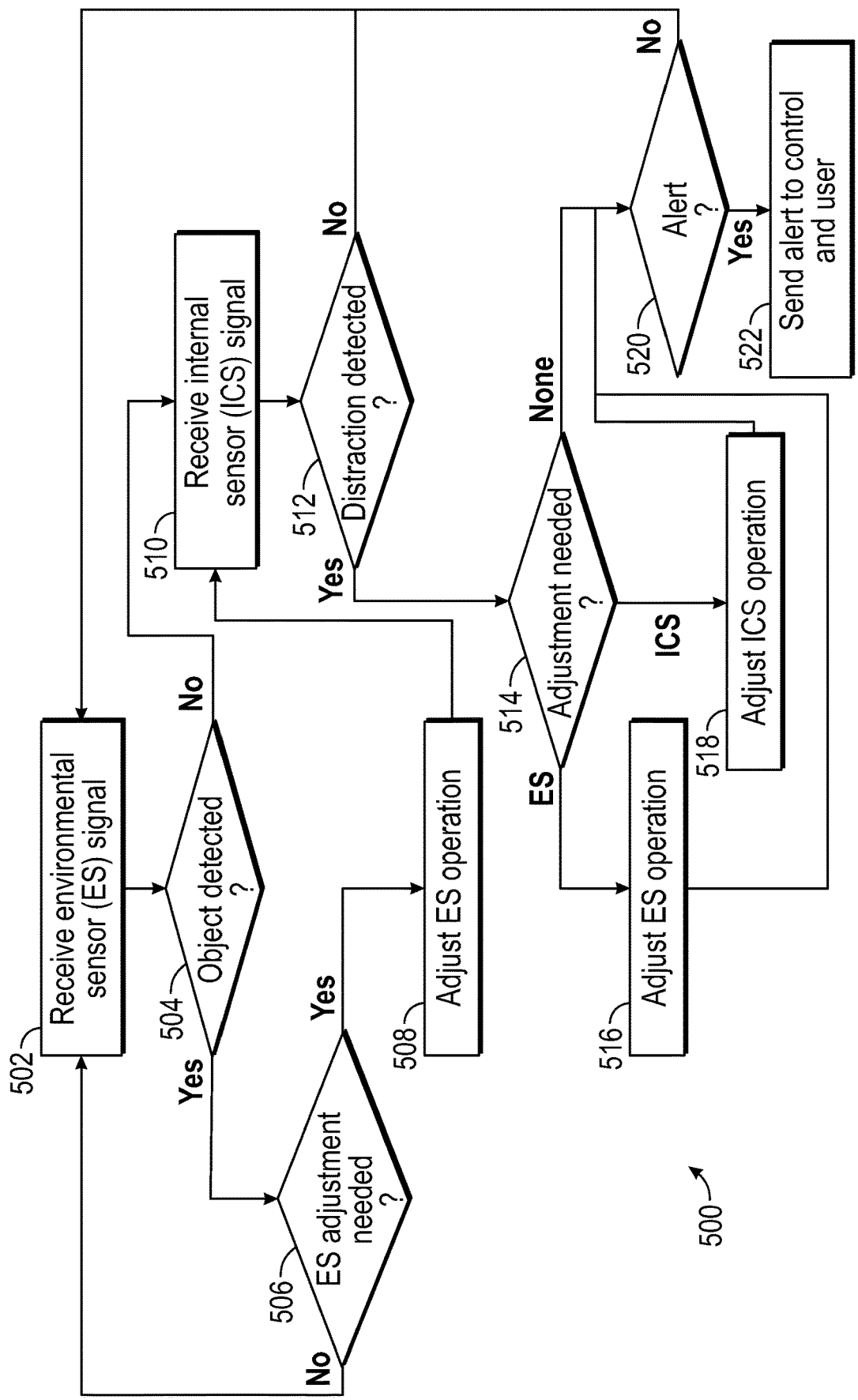
FIGS. 5, 6 and 7 illustrate a flow chart for operation and adjustment of a metasensor, according to implementations of the subject technology.

FIG. 5 illustrates a flow chart of a process 500 for operation of a metasensor starting on receipt of an environmental sensor (ES) signal, 502. When an object is detected, 504, the process 500 continues to determine if an ES adjustment is to be made, 506. Where there is no adjustment, the process 500 returns to step 502, else the process 500 adjusts ES operation, 508, and continues to process internal information. When an object is not detected, 504, processing continues to step 510 to receive the ICS signal. In some options, steps 502 and 510 operate in parallel. If no distraction is detected, 512, operation returns to receiving sensor information, 502. When distraction is detected, 512, the process 500 determines to make an adjustment of ES operations, 516, or ICS operation, 518. When an alert is required, 520, such as to wake up the driver, or other alarm, then processing continues to step 522.

Figure 6:
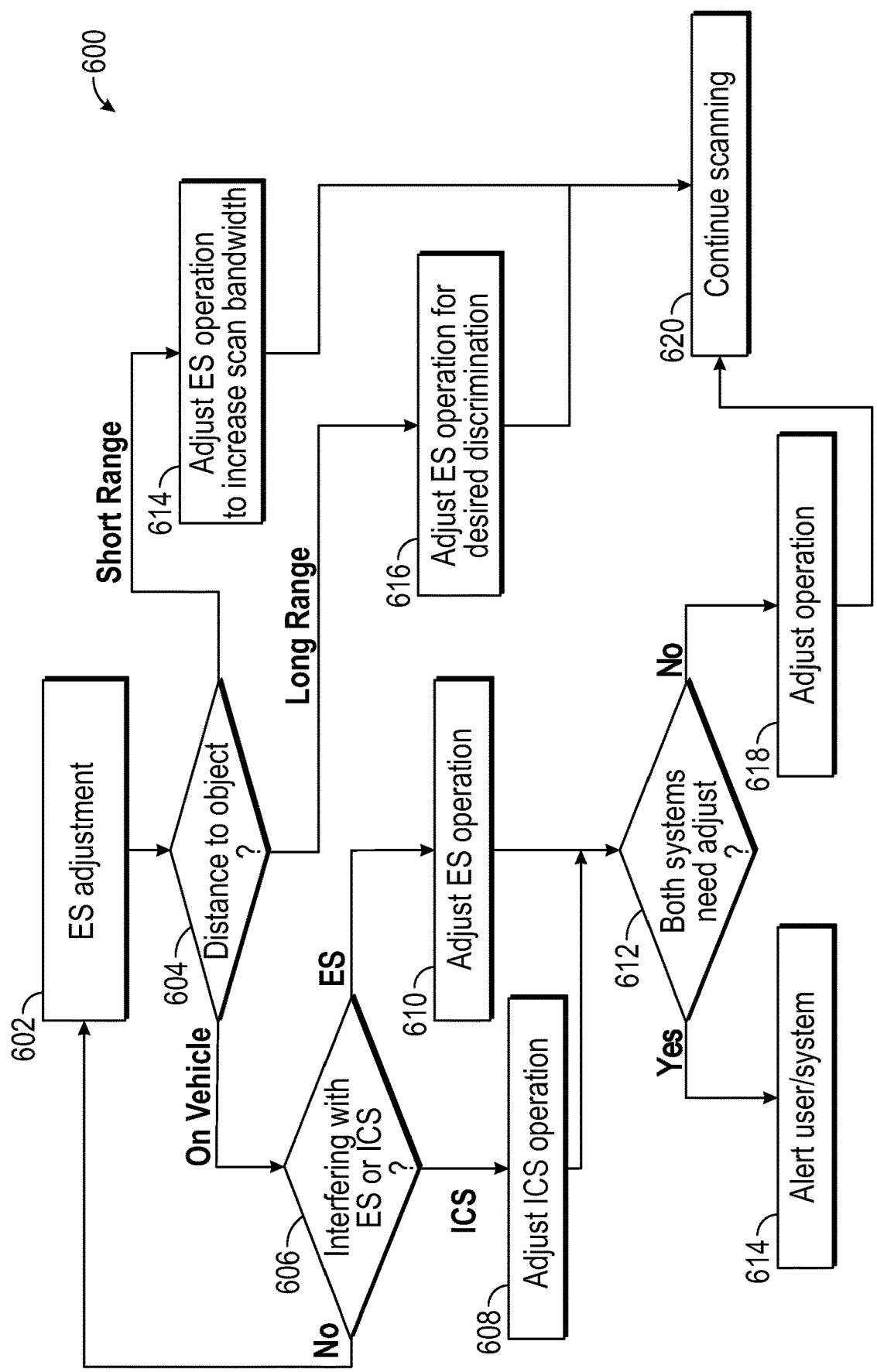

FIG. 6 illustrates a process 600 for ES adjustment, 602, when the process 500 determines that a change in operating conditions and parameters of the ES is required. The process 600 determines a distance to an object, 604, such as short range, long range or an object on the vehicle that may impair operation. For short range objects, the process 600 adjusts detection parameters associated with the ES operation to increase the scan bandwidth and range of the sensor, 614, and continues scanning, 620. For long range object detection, processing continues to adjust detection parameters associated with the ES operation to a desired range, angular resolution, 616, and so forth, then continues scanning, 620. When an object is detected on an object, such as an object that interferes with a radar sensor or visibility of the driver, the process 600 determines if the object interferes with ES or ICS operation and responds accordingly, 610, 608, respectively. If there is a failure of both systems, 612, then an alert is sent to a central controller, such as a sensor fusion, and/or an alert is sent to a driver, 614. When one system may be adjusted to compensate for the loss or limited use of another sensor, the process 600 adjusts operation 618 as possible and continues scanning, 620.

Figure 7:
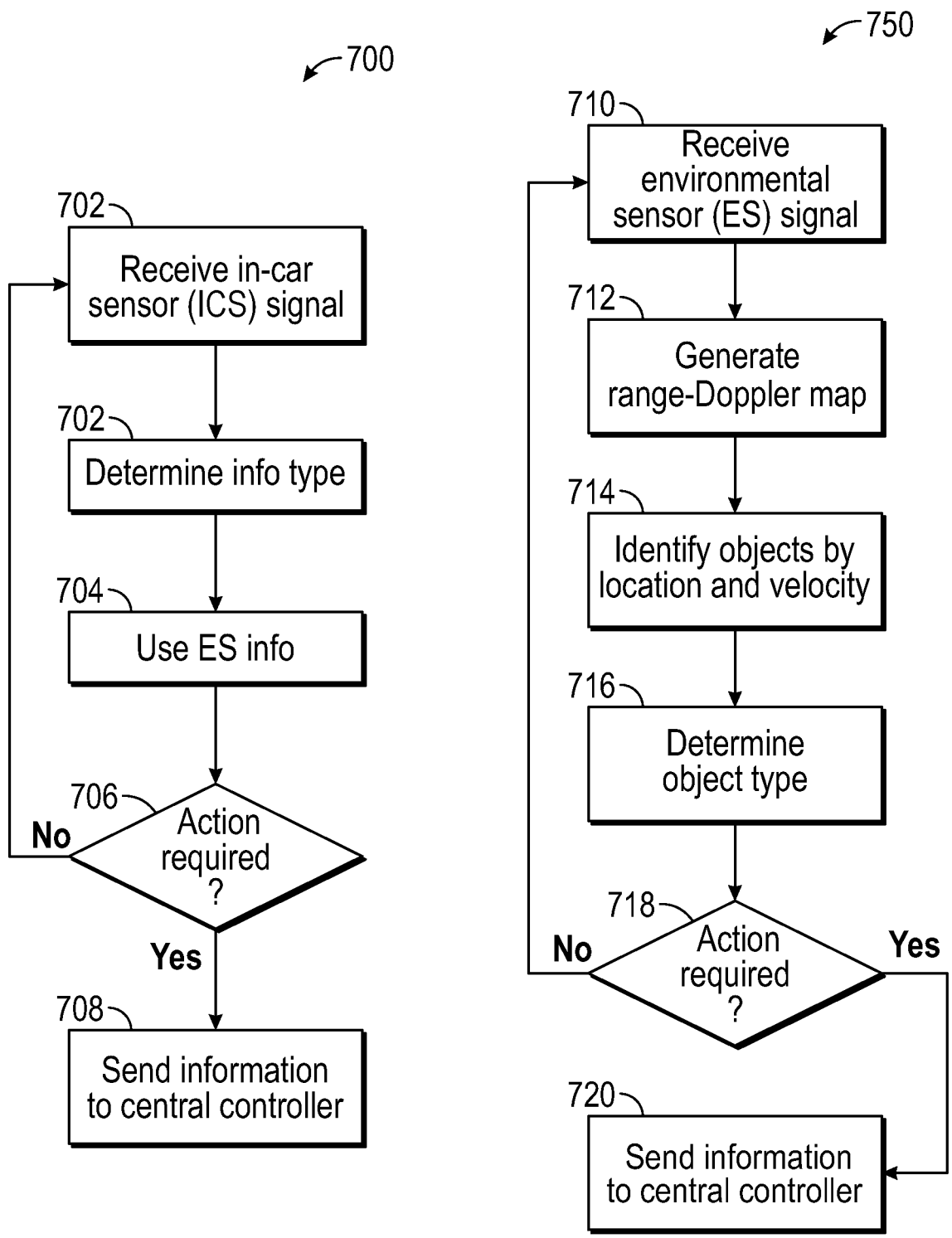

FIG. 7 illustrates a process 700 for operation of the internal condition sensor, or ICS, 702, to determine the type of information received, 702. This may be a simple indication of a distraction level as compared to a threshold level or may be a specific type of distraction, such as the driver is texting or watching a video. The process 700 accesses ES information, 704 and determines if an action is required to adjust detection parameters associated with the internal sensor, 706. If no action is required, then processing returns to step 702, and if action is required, processing sends information to a central controller, 708. FIG. 7 also illustrates a process 750 for operation of the environmental sensor. Where the process 750 receives an ES signal, 710, a RD mapping is made, 712 to identify objects by location and velocity, 714 and determine an object type 716. If an action is required to adjust detection parameters associated with the sensor, 718, the process 750 sends information to a central controller, 720; else the process 750 returns to step 710.

Figure 8:
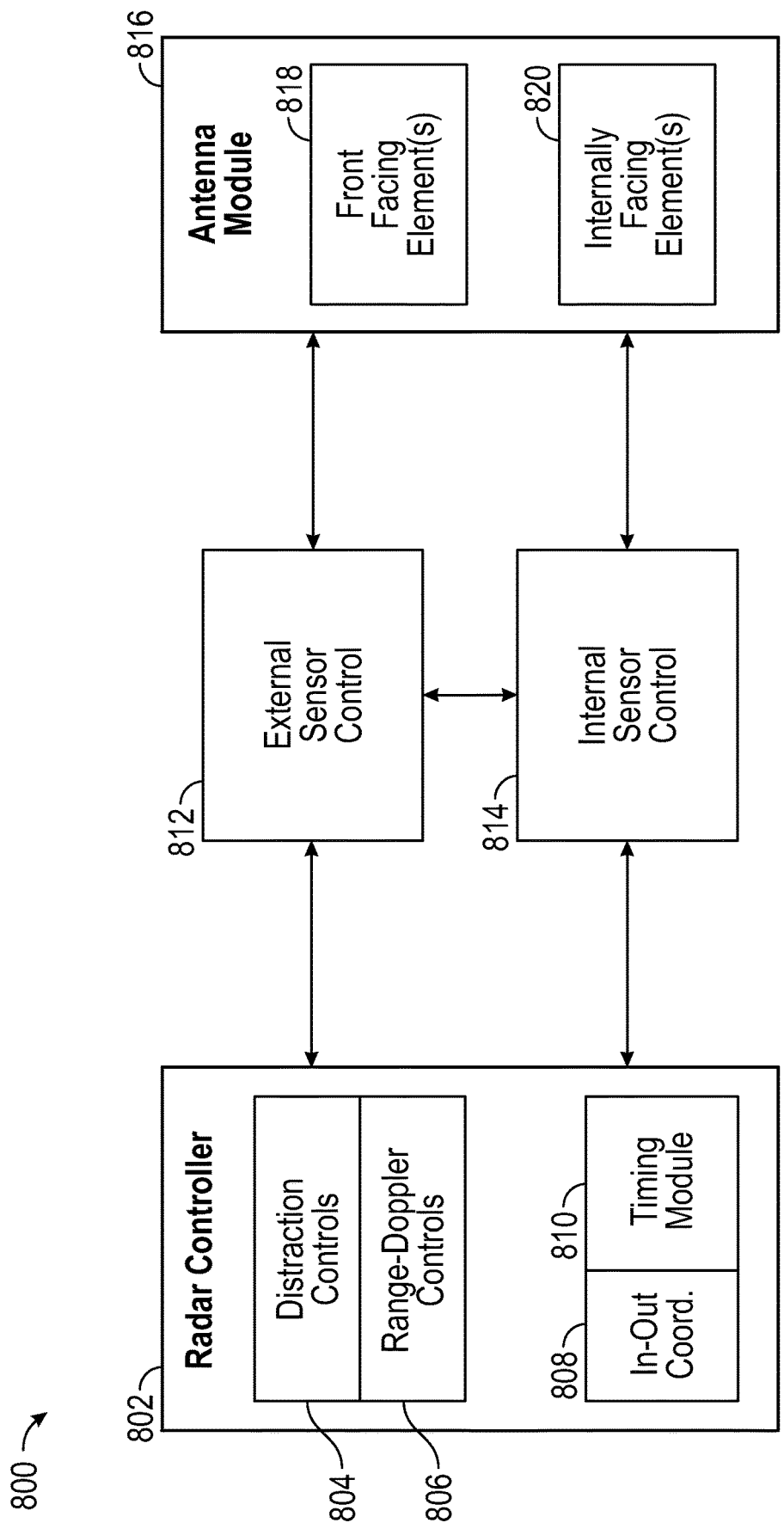
FIG. 8 illustrates a metasensor radar configuration, according to implementations of the subject technology.

A sensor module 800 is illustrated in FIG. 8 for a radar system, having antenna module 816 with front facing element(s) 818 and internally facing element(s) 820. The antenna module is controlled by external sensor control 812 and internal sensor control 814. Operation of the element(s) 818, 820 may be controlled individually, or partially by each control, 812, 814. In some implementations, controls 812, 814 each include operational modules to interface with both elements 818, 820 of the antenna module 816, such as for adjustments and interpretation of received signals and information. A radar controller 802 includes distraction controls 804 to compare distraction measures against thresholds to determine how to respond and control a vehicle. The RD controls 806 determine the distance to an object, its location and velocity. An in-out coordination unit 808 enables expanded and comprehensive sensing and control by using information from within the vehicle as well as the external radar sensing information. A timing module 810 is incorporated for specific operation, such as when internal sensing is turned off for a period of time to enable external sensing, in using a single element(s) for operation, where a same antenna is time-division-multiplexed to scan internal and external operation, and so forth.

Figure 9:
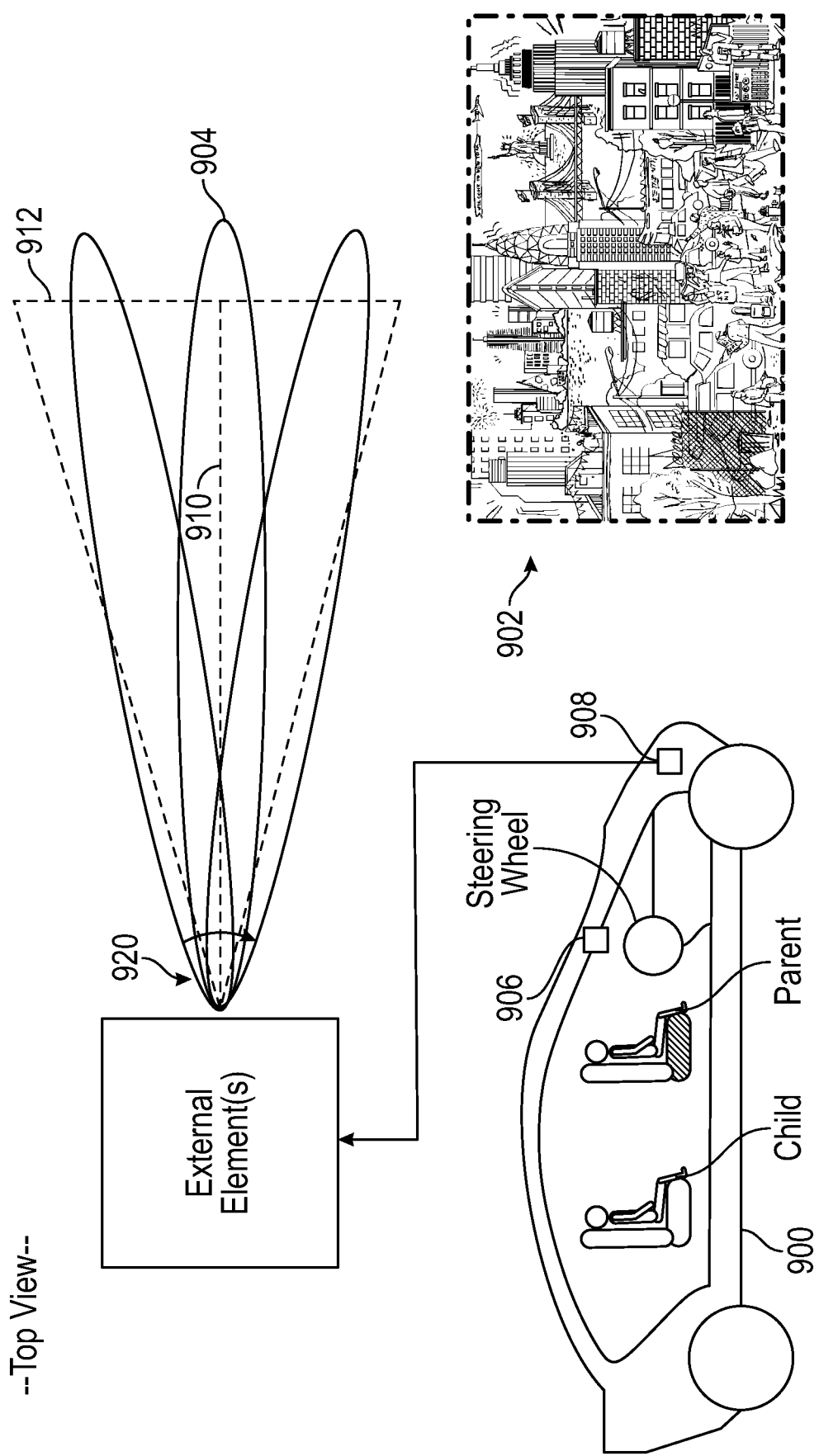
FIG. 9 illustrates external elements of a metasensor, according to implementations of the subject technology.

FIG. 9 illustrates a vehicle 900, as in FIG. 3, having an external sensor 908 located on a front of the vehicle 900, and having an internal sensor 906 positioned near the driver's seat. The external elements 908 sense an environment 902 to detect objects therein using radiation patterns 904. External element(s) 908 are illustrated from a top view, showing the scanning range of the radiation beams 904. The range 910 is the distance from the external elements 908 to the object and is illustrated here for the boresight direction. The angular range 920 of the transmission signal results in a coverage distance 912 as the beam is steered to achieve coverage.

Figure 10:
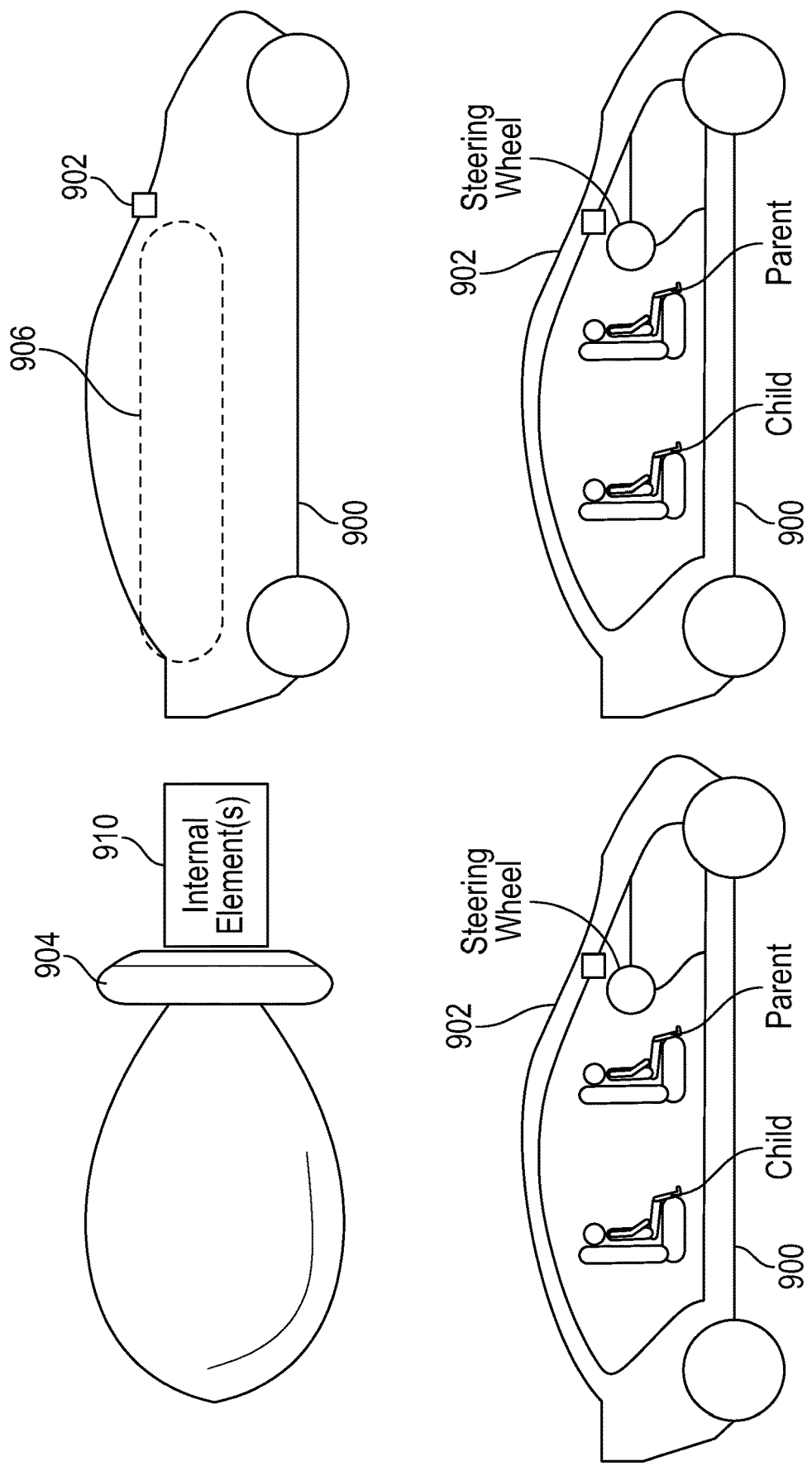
FIG. 10 illustrates internal elements of a metasensor, according to implementations of the subject technology.

FIG. 10 illustrates vehicle 900 having an internal sensor 902 having internal element(s) 910, which in operation generates radiation pattern 904. The pattern within the vehicle is illustrated as radiation pattern 906. This enables the radar to detect activity, movement, health measures and so forth within the car; these enable a distraction measure. Additionally, the internal sensor 902 is able to detect electronic activity and wireless activity that may impair the driver's ability to control the vehicle 900. A metasensor may use radar sensors to capture movements, recognize respiration patterns, identify changes in a user's activity and detect electronics or other distraction activities. The radar sensor may also determine a baseline for a driver, that may include measurements of health, activity and other behaviors. In some implementations, the sensor uses a baseline to determine the driver's position and response times if they are falling asleep, impaired or distracted. Any deviation from the baseline behavior may trigger an alert message to the driver, an alert to a driver assist service, such as On-Star, and so forth. In some cases, the trigger may reduce the speed of the vehicle or call for help. In some cases, the voice control system of the vehicle may ask the driver to answer some questions or to respond by selecting a button on the vehicle dashboard; a slow response will indicate distraction, impairment or other condition and trigger yet more significant actions to ensure safe operation of the vehicle. In some situations, a specific measurement may trigger fully autonomous control of the vehicle, or may provide a signal or message to other drivers as to the condition.

In some implementations, the antenna structures are manufactured in close proximity and may be integral parts of one another, such as unit 1000 of FIG. 11, where an internal antenna portion 1002 is positioned proximate an external antenna portion 1004. The antenna portions may be patch antennas, metastructure antennas, metamaterial antennas and so forth. The internal antenna portion 1002 and the external antenna portion 1004 may have different types of radiating element(s). In some implementations, portion 1004 has an array of elements, and the internal portion 1002 has a single element. The array of elements of this implementation are arranged in columns, however, a variety of configurations may be used. The elements are unit cells, that may be patches, metamaterial cells, metasurfaces, or other shapes and materials. The internal antenna 1002 is positioned facing toward the inside of the vehicle, while the exterior antenna is faced toward the outside of the vehicle. They may be positioned 180° from each other or may be positioned at other angles.

Figure 12:
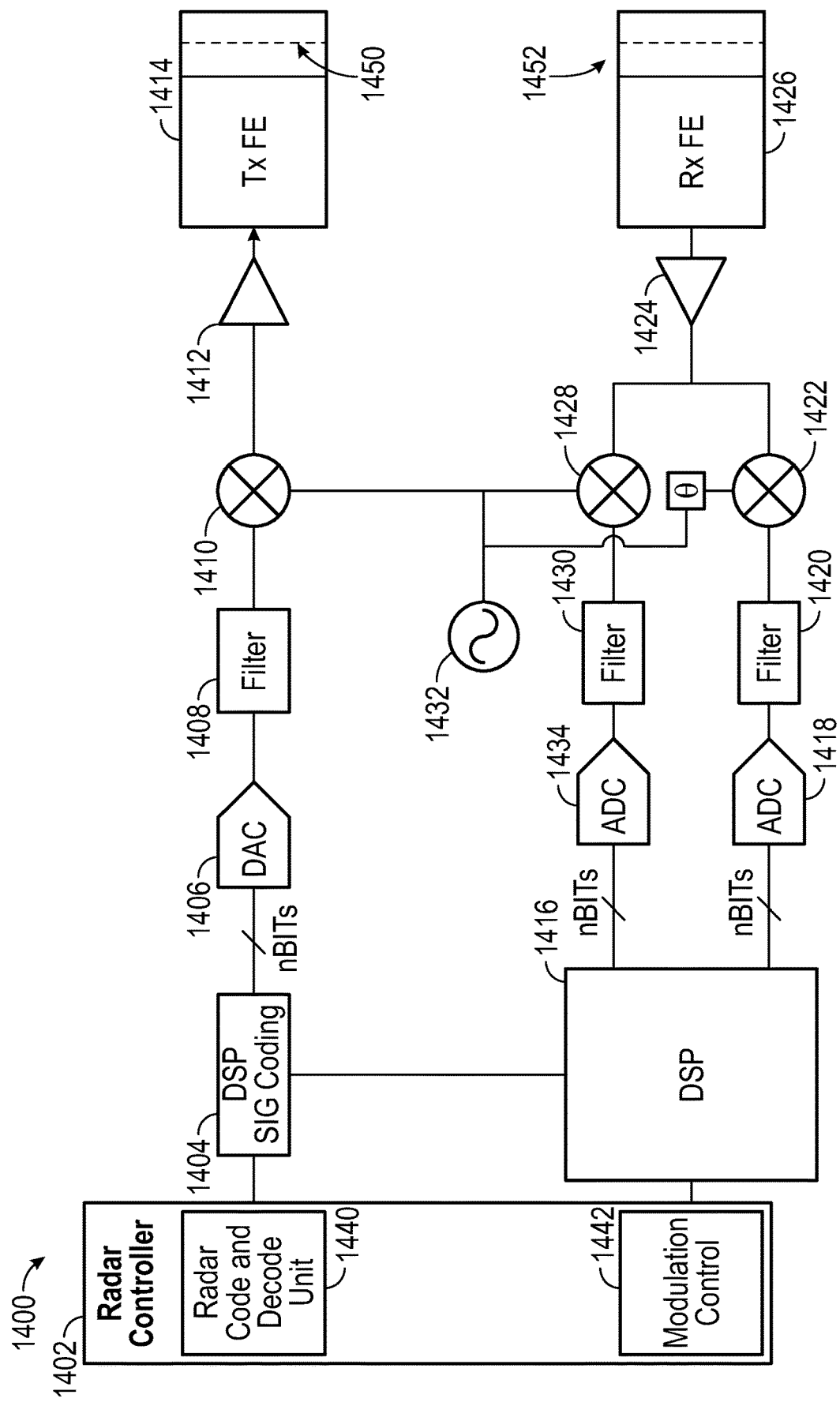
FIG. 12 illustrates a metasensor radar unit, according to implementations of the subject technology.

FIG. 12 illustrates a RSU 1400 having transmit and receive antennas, sometimes referred to as a monostatic radar unit. Other units may implement systems that use a single antenna or set of antennas for both transmit and receive. The RSU 1400 operates to detect range to an object from a pulse delay, velocity of an object from the Doppler frequency shift, as well as angular direction of transmission and arrival of radar and echo, respectively. Each object has a cross-sectional signature determined by the target size, shape, components, movement, material composition, and so forth. Radar controller 1402 supervises operation of RSU 1400, including generating the digital signal processing (DSP) signal coding for transmission from DSP unit 1404, which is provided to a digital-to-analog converter 1406 for transmission from antenna unit 1414. The DSP unit 1404 provides a number, n, of bits of digital data (nbits) to DAC

1406, which converts the digital signal to an analog signal. The analog signal is then put through filter 1408 and the filtered signal is coupled to mixer 1410 to be modulated on a carrier signal provided by signal generator 1432. In the present implementations, the signal generator 1432 provides a pulse modulation scheme, but alternate implementations may use other modulation schemes that also enable range-Doppler detection and NLOS detection. The modulated signal is then put into power amplifier 1412 for transmission as radiation beams over the air from antenna unit 1414. As illustrated, the transmit antenna unit 1414 includes a power distribution network 1450 to a radiating structure, antenna. In the present implementation, the antenna unit 1414 is based on meta-structures to achieve superior performance.

Continuing with RSU 1400, mixer 1410 is coupled to mixer 1428 in the receive chain, which includes receive antenna unit 1426 having power distribution and antenna network 1452. Received signals are provided to a low noise amplifier (LNA) that is coupled to mixers 1428, 1422. The paths are then filtered and converted back to digital signals having n-bits each, which are then provided to DSP 1416.

The radar controller 1402 includes an Rx power threshold control unit 1440 to set the power threshold for comparison of Rx signals, including to reduce the power threshold for detection of NLOS objects. The radar controller 1402 also includes a modulation controller 1442 to generate and control coding of the transmission signals, such as to implement Kasami coding. This coding enables the RSU 1400 to identify its transmissions from those of other RF sources.

The present disclosure provides a metasensor operational to detect objects in the environment and distractions within a vehicle. The different types of sensors operate in coordination and enable compensation when possible. The results of each sensor may be used to determine operational characteristics and requirements of the other.

The radar system 1400 of FIG. 12 may implement the various aspects, configurations, processes and modules described throughout this description. The radar systems may be configured for placement in an autonomous driving system or in another structure in an environment (e.g., buildings, billboards along roads, road signs, traffic lights, etc.) to complement and supplement information of individual vehicles, devices and so forth. The radar system scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system leverages intelligent meta-structures and AI techniques to create a truly intelligent digital eye for autonomous vehicles.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. A radar sensing unit for a vehicle, comprising:
an internal distraction sensor comprising one or more first antenna elements facing in a direction toward an interior environment of the vehicle, the internal distraction sensor configured to radiate radio frequency (RF) beams from the one or more first antenna elements to the interior environment of the vehicle and obtain measurements of user activity within the vehicle;
an external object detection sensor comprising one or more second antenna elements facing in a direction toward a surrounding environment that is exterior of the vehicle, the external object detection sensor configured to detect an object in the surrounding environment of the vehicle;
a coordination sensor coupled to the internal distraction sensor and the external object detection sensor, the coordination sensor configured to coordinate detection measurements between the internal distraction sensor and the external object detection sensor; and
a central controller configured to adjust operation of the internal distraction sensor or the external object detection sensor in response to information received from the coordination sensor,
wherein the coordination sensor is further configured to:
receive an internal condition sensor signal from the one or more first antenna elements;
determine a type of information from the internal condition sensor signal;
obtain environmental sensor information from the one or more second antenna elements;
determine whether an action with the one or more second antenna elements is required based at least on the determined type of information in the internal condition sensor signal and the obtained environmental sensor information; and
send sensor adjustment information to the central controller when the action with the one or more second antenna elements is determined to be required.

2. The radar sensing unit of claim 1, wherein the coordination sensor is further configured to:
receive an environmental sensor signal from the one or more second antenna elements;
generate a range-Doppler map from the environmental sensor signal;
identify one or more objects by location and velocity from the range-Doppler map;
determine an object type for each of the identified one or more objects;
determine whether an action with the one or more first antenna elements is required at least on the determined object type of each of the one or more objects and corresponding location and velocity of the one or more objects; and
send sensor adjustment information to the central controller when the action with the one or more first antenna elements is determined to be required.

3. The radar sensing unit of claim 1, wherein the measurements of the user activity comprise movement measurements of the user within the vehicle and vital sign measurements of the user, and wherein the vital sign measurements comprise at least one of a heart rate, a respiration rate, or an eye movement.

4. The radar sensing unit of claim 3, wherein the measurements of the user activity comprise one or more user interactions with electronic devices that impair an ability of the user operating the vehicle to control the vehicle.

5. The radar sensing unit of claim 1, wherein the one or more first antenna elements are configured to:
receive the RF beams reflected from a user within the interior environment of the vehicle, and
generate radar data from the received RF beams for determining a baseline measurement of the user from the radar data, the radar data indicating measurements of movement, electronic activity, and health associated with the user.

6. The radar sensing unit of claim 5, wherein the radar sensing unit further comprises an antenna controller adapted to direct the RF beams radiated from the one or more first antenna elements.

7. The radar sensing unit of claim 1, wherein an external RF beam is an FMCW modulated beam.

8. The radar sensing unit of claim 1, further comprising:
a distraction metric measurement means to determine user activity within the vehicle from the internal distraction sensor.

9. The radar sensing unit of claim 8, further comprising:
an adjustment means to adjust one or more detection parameters of the radar sensing unit based at least on the detected object and the distraction metric.

10. The radar sensing unit of claim 9, wherein the distraction metric indicates one or more of distractions or environmental conditions that impair an ability of a user operating the vehicle to react and respond to changes in a surrounding environment.

11. The radar sensing unit of claim 1, wherein the radar sensing unit is a metasensor module configured to monitor internal and external conditions of a vehicle.

12. A method of operating a radar sensing unit for a vehicle, comprising:
obtaining measurements of user activity within the vehicle from one or more first antenna elements facing in a direction toward an interior environment of the vehicle, wherein the one or more first antenna elements are configured to radiate radio frequency (RF) beams to the interior environment of the vehicle;
detecting, from the sensing unit, an object in a surrounding environment of the vehicle from one or more second antenna elements facing in a direction toward the surrounding environment that is exterior of the vehicle;
coordinating detection measurements internal and external to the vehicle;
adjusting operation of the one or more first and second antenna elements;
receiving an internal condition signal from the one or more first antenna elements;
determining a type of information from the internal condition signal;
obtaining environmental information from the one or more second antenna elements;
determining whether an action with the one or more second antenna elements is required based at least on the determined type of information in the internal condition signal and the obtained environmental information;
determining an adjustment when required; and
sending sensor adjustment information to the one or more second antenna elements when required.

13. The method of claim 12, further comprising:
receiving an external radar signal at the one or more second antenna elements;
generating a range-Doppler map based on the external radar signal;

identifying one or more objects by location and velocity from the range-Doppler map;
determining an object type for each of the identified one or more objects;
determining whether an action with the one or more first antenna elements is required based at least on the determined object type of each of the one or more objects and corresponding location and velocity of the one or more objects; and
sending adjustment information to the one or more first antenna elements when required.

14. The method of claim 13, wherein the measurements of the user activity comprise at least one of movement measurements of the user within the vehicle aftti. or a vital sign measurement of the user.

15. The method of claim 14, wherein the vital sign measurement comprises at least one of a heart rate, a respiration rate or an eye movement.

16. The method of claim 15, wherein the measurements of the user activity comprise one or more user interactions with electronic devices that impair an ability of the user operating the vehicle to control the vehicle.

17. The method of claim 16, further comprising identifying an ambient condition of the vehicle as a default state of the vehicle.

18. The method of claim 17, wherein the adjustment information is designed to return a state of the vehicle to the default state.

* * * * *